United States Patent [19]
Fleming, Jr. et al.

[11] Patent Number: 5,578,106
[45] Date of Patent: Nov. 26, 1996

[54] METHOD FOR MAKING OPTICAL FIBER PREFORMS BY COLLAPSING A HOLLOW GLASS TUBE UPON A GLASS ROD

[75] Inventors: James W. Fleming, Jr., Westfield; Adolph H. Moesle, Jr., Murray Hill, both of N.J.

[73] Assignee: Lucent Technologies Inc., Murray Hill, N.J.

[21] Appl. No.: 516,111

[22] Filed: Aug. 17, 1995

Related U.S. Application Data

[63] Continuation of Ser. No. 159,026, Nov. 29, 1993, abandoned.

[51] Int. Cl.$^6$ ............................................. C03B 37/012
[52] U.S. Cl. .......................... 65/391; 65/412; 65/428; 65/36; 65/57
[58] Field of Search ........................ 65/428, 391, 412, 65/371, 382, 37, 36

[56] References Cited

U.S. PATENT DOCUMENTS

| | | | |
|---|---|---|---|
| 3,486,870 | 12/1969 | Vervaart | 65/36 |
| 4,596,589 | 6/1986 | Perry | 65/428 |
| 4,597,785 | 7/1986 | Karbassiyoon | 65/382 |
| 5,171,966 | 12/1992 | Fukuoka | 219/125.12 |
| 5,188,648 | 2/1993 | Geittner | 65/391 |

FOREIGN PATENT DOCUMENTS

| | | |
|---|---|---|
| 0439918 | 8/1941 | European Pat. Off. . |
| 0171103 | 12/1986 | European Pat. Off. . |
| 0244135 | 4/1987 | European Pat. Off. . |
| 0309026 | 3/1989 | European Pat. Off. . |
| 0484035 | 10/1991 | European Pat. Off. . |
| 0530917 | 3/1993 | European Pat. Off. . |
| 3720029 | 12/1988 | Germany . |

OTHER PUBLICATIONS

"Plasma–Collapsing: A New Alternative for High–Rate Collapsing of Fibre Preforms" XIII ELOL 87 Technical Digest vol. III pp. 63–66 A. H. E. Breuls et al.

*Primary Examiner*—John M. Hoffmann
*Attorney, Agent, or Firm*—Glen E. Books; Bruce S. Schneider

[57] ABSTRACT

In accordance with the invention, a plurality of elongated refractory bodies are laminated together by placing the bodies in close adjacency, exposing the adjacent bodies to a plasma torch heat source, and moving the bodies longitudinal past the torch at a nonzero average rate which includes a reciprocating (e.g., oscillatory) component to longitudinally spread the zone of heating. Where the bodies are a rod to be laminated within a hollow tube, it is advantageous to reduce the air pressure between the rod and tube, thereby eliminating potential contaminants and, at the same time, biasing the tube to collapse against the rod. This method is particularly useful in laminating overcladding tubes to core rods to form optical fiber preforms.

3 Claims, 2 Drawing Sheets

```
PLACE BODIES ADJACENT TO ONE ANOTHER — A
              ↓
FORCE BODIES TOWARD EACH OTHER — B
              ↓
EXPOSE BODIES TO PLASMA TORCH, MOVING
WITH AVERAGE SPEED AND SUPERIMPOSED — C
RECIPROCATING MOTION
```

METHOD FOR MAKING OPTICAL FIBER PREFORMS BY COLLAPSING A HOLLOW GLASS TUBE UPON A GLASS ROD

This application is a continuation of application Ser. No. 08/159,026, filed on Nov. 29, 1993 abandoned.

FIELD OF THE INVENTION

This invention relates to the fabrication of laminated refractory bodies such as, for example, optical fiber preforms.

BACKGROUND OF THE INVENTION

While potentially useful in a wide variety of applications, the present invention evolved in the field of optical libor fabrication. Optical fibers are thin strands of glass capable of transmitting an optical signal containing a large amount of information over long distances with very low loss. Optical fibers are typically manufactured by constructing an optical fiber preform of appropriate composition and drawing fiber from the preform.

A typical preform is in the form of a concentric glass rod having a length of about one meter and an outer diameter of 20–200 mm. The inner core of the rod is a high purity, low loss glass such as germanium silicate glass having a diameter of about 1–5 mm. The concentric outer cylinder, referred to as cladding, is a layer of glass with a lower index of refraction than the inner core.

In conventional manufacture of an optical fiber preform, the core is manufactured as a solid doped silica glass rod within the cladding. An outer jacket of silicate glass, referred to as the overcladding, is then added around the rod in order to provide the desired geometry for fiber draw. Specifically, the rod is placed within the overcladding tube, and the rod and overcladding are laminated to form a fiber optic preform by heating the assembly with an oxyhydrogen torch.

A difficulty with this process is that the lamination introduces in the outer periphery of the overcladding OH impurities which can be deleterious to a drawn fiber. As a consequence it is typically necessary to etch away the outer 0.5 mm of the preform with a plasma torch to eliminate the surface contaminated by the oxyhydrogen torch. Accordingly, there is a need for an improved method and apparatus for laminating overcladding and core rod in fiber optic preforms.

SUMMARY OF THE INVENTION

In accordance with the invention, a plurality of elongated refractory bodies are laminated together by placing the bodies in close adjacency, exposing the adjacent bodies to a plasma torch heat source, and moving the bodies longitudinal past the torch at a nonzero average rate which includes a reciprocating (e.g., oscillatory) component to longitudinally spread the zone of heating. Where the bodies are a rod to be laminated within a hollow tube, it is advantageous to reduce the air pressure between the rod and tube, thereby eliminating potential contaminants and, at the same time, biasing the tube to collapse against the rod. This method is particularly useful in laminating overcladding tubes to core rods to form optical fiber preforms.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
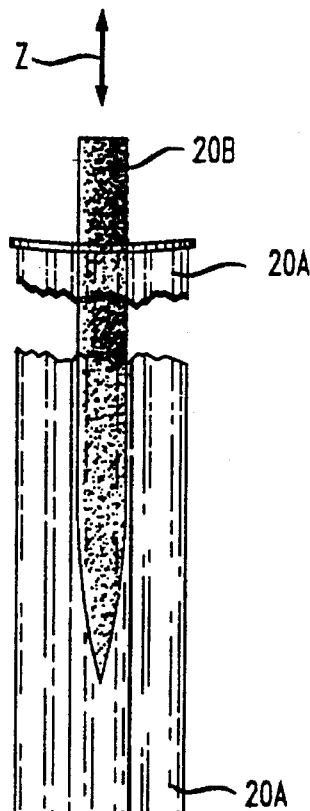
FIG. 1 is a block diagram illustrating a method for laminating elongated refractory bodies.

Referring to the drawings, FIG. 1 is a flow diagram showing the process steps used to laminate a pair of elongated refractory bodies. The first step shown in block A is to put the two bodies in close adjacency. When the two bodies are a rod to be laminated within a hollow tube, the rod can be inserted within the tube.

The next step shown in block B of FIG. 1 is to provide a force biasing the adjacent bodies toward one another. In the rod/tube example, this can be accomplished by partially evacuating the tube so that there is ambient pressure on the tube pushing radially inward. Where one of the bodies is an outer tube, the biasing force can arise as a consequence of heating the tube to its softening temperature. The tendency of the softened material to minimize surface tension will shrink the periphery of the softened region.

The third step shown in block C is to expose the assembly to a plasma torch and, at the same time, to move the assembly and the torch relative to one another in such a fashion that: 1) the assembly and the torch have a non-zero average longitudinal speed, and 2) the assembly and the torch have a reciprocating motion superimposed on the overall longitudinal motion for extending the longitudinal region heated by the torch. Thus as the torch moves longitudinally along the assembly it also moves back and forth in a shorter amplitude to extend the region of heating. In the case of a tube/rod assembly, the tube preferably rotates so that all sides of the longitudinal region are heated. Advantageously the heating is commenced at the end of the tube remote from the vacuum pump.

The effect of this process is to heat to a softened state the longitudinal portion of the assembly within the amplitude of the reciprocal motion. In the tube/rod example, the pressure differential collapses the heat softened tube against the rod within thereby laminating the two bodies. The lamination process preferably starts at the remote end of the assembly and progresses to the end connected to the vacuum pump.

It should be understood that an overpressure exterior to the tube could be substituted for evacuation and that a similar process omitting the evacuation step could be used in laminating elongated refractory bodies of different shape, e.g. laminating two strips. Moreover if a second hollow tube is substituted for a solid rod, the center of the interior tube could be pressurized rather than evacuating the exterior tube.

Figure 2:
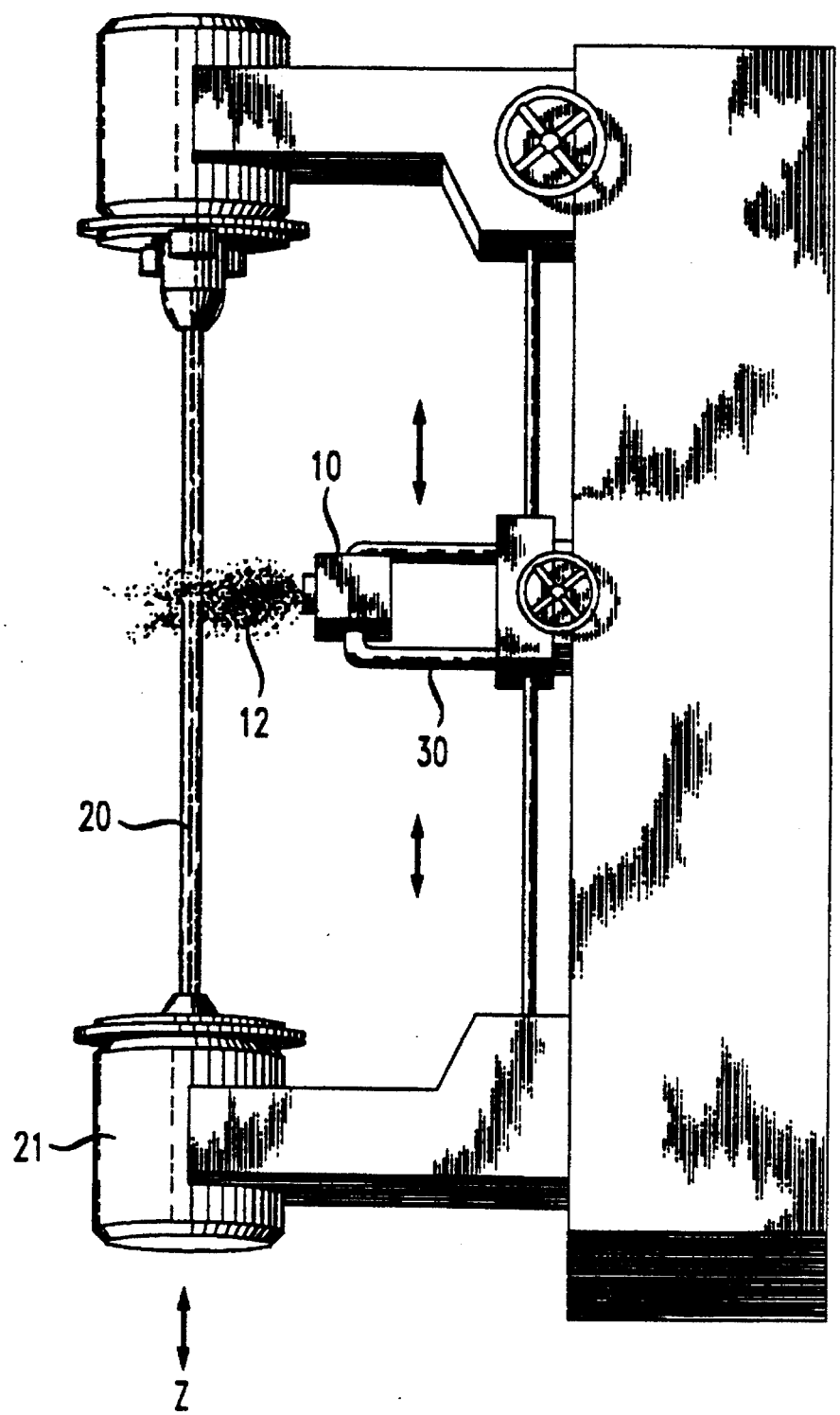
FIG. 2 is a schematic view of preferred apparatus for practicing the method of FIG. 1 in the lamination of optical fiber preforms.

FIG. 2 schematically illustrates apparatus useful in practicing the method of FIG. 1 wherein an elongated assembly 20, such as a cladding tube, core rod assembly, is shown mounted on a controllable speed lathe 21. The apparatus is similar to that described in U.S. Pat. No. 5,221,306 which is incorporated herein by reference. Preferably the lathe is oriented vertically so that the supported ends will not be subjected to substantial torque and the assembly 20 will not sag upon heating. The lateral surface of assembly 20 is exposed to the plasma fireball 12 of a plasma torch 10 such as that described in detail in U.S. Pat. No. 5,000,771, which is incorporated herein by reference.

The plasma torch 10 is mounted on a three axis positioning stage 30 based on the same bed (not shown) as lathe 21 so that the torch position can be precisely controlled during operation. A computer (not shown) is provided to coordinate and control the rotation of body 20 via lathe 21 and the movement of the torch 10 via positioning stage 30. The computer controls the rotational speed of the body 20 about the Z-axis and the speed of the torch 10 along the Z-axis.

In the lamination of preforms, lathe 21 is preferably a glass lathe having simultaneously rotating chucks at both ends of body 20, such as a Litton Glass Lathe marketed by Litton Engineering Co. Step motors (not shown) are provided to drive the three axes of the positioning stage 30 controlling the location and traverse speed of torch 10.

Figure 3:
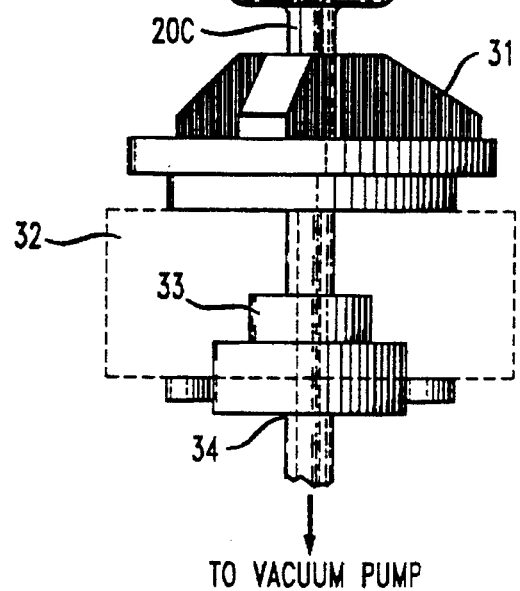
FIG. 3 is a detailed cross section of the end mounting portion of the apparatus of FIG. 2.

The bottom chuck is preferably modified as shown in FIG. 3 so that the interior of cladding tube 20A below rod 20B can be partially evacuated. In essence, a reduced diameter portion of the cladding tube, termed the "handle" 20C, extends through a central opening in the chuck 31 and tailstock 32 so that the handle rests on and seals with a gasket 33. A concentric channel extends via a rotary seal 34 to the open center of the gasket 33, thereby placing the interior of tube 20A in communication with a vacuum pump (not shown). In exemplary operation, core rod 20B is inserted in a cladding tube 20A and mounted onto the apparatus of FIG. 3. The vacuum pump is activated to pump down the pressure in the tube to 25 in. of water. The tube is rotated at 30–35 rpm, and the torch is positioned at the top of the tube about 5–10 mm from the tube. The torch is moved longitudinally down the tube at 2–5 cm/min. with a superimposed reciprocal motion having frequency of 0.5–5 cps (preferably 1 cps) and an amplitude of 5–10 cm in the longitudinal direction.

The result of this process is that the cladding collapses onto the inner rod as the torch moves down the tube. The advantages of the process over the prior oxyhydrogen torch process are threefold: 1) the plasma torch does not introduce impurities into the cladding; 2) the longitudinal temperature profile is now subject to control by control by frequency and amplitude of torch oscillations; and 3) the lamination of tube or rod using the plasma torch is about twice as fast as an oxyhydrogen torch.

It is understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A method of collapsing a hollow glass tube upon a glass rod comprising the steps of:

placing said rod within said hollow tube;

applying a force for biasing said tube inwardly toward said rod; and exposing said tube to a plasma torch heat source moving longitudinally in relation to said tube and rod at a non-zero average rate which includes a reciprocating component of longitudinal motion, wherein the combination of said force and heat from said source collapsing said tube upon said rod.

2. The method of claim 1 wherein said force for biasing is applied by at least partially evacuating the interior of said hollow tube.

3. The method of claim 1 wherein said hollow glass tube and said glass rod comprise silica glass.

\* \* \* \* \*